United States Patent [19]

Wiemer

[11] Patent Number: 4,728,222

[45] Date of Patent: Mar. 1, 1988

[54] ARRANGEMENT FOR COLLECTING SEEPAGE WATER FROM DEPOSITORIES

[75] Inventor: Klaus Wiemer, Kronberg, Fed. Rep. of Germany

[73] Assignee: ED. Züblin Aktiengesellschaft, Stuttgart, Fed. Rep. of Germany

[21] Appl. No.: 748,999

[22] Filed: Jun. 26, 1985

[30] Foreign Application Priority Data

Jun. 26, 1984 [DE] Fed. Rep. of Germany ....... 3423438

[51] Int. Cl.⁴ .................. B65G 5/00; E02D 3/00
[52] U.S. Cl. ..................................... 405/128; 405/52; 405/53
[58] Field of Search ................... 405/36–38, 405/52–55, 51, 128, 129, 132, 134–138, 150, 229, 266, 267, 270; 52/169.1, 742; 138/97; 252/633

[56] References Cited

U.S. PATENT DOCUMENTS

| | | | |
|---|---|---|---|
| 2,787,125 | 4/1957 | Benz | 405/53 |
| 2,947,146 | 8/1960 | Loofbourow | 405/266 X |
| 2,971,259 | 2/1961 | Hahnau et al. | 138/97 X |
| 3,047,184 | 7/1962 | Van Bergen et al. | 405/53 X |
| 3,940,940 | 3/1976 | Barrett | 405/54 X |
| 4,147,452 | 4/1979 | Ogasawara et al. | 405/134 |
| 4,352,601 | 10/1982 | Valiga et al. | 405/128 X |
| 4,362,434 | 12/1982 | Valiga et al. | 405/128 |
| 4,425,743 | 1/1984 | Bartur | 405/53 X |
| 4,453,857 | 6/1984 | Serra et al. | 405/129 X |
| 4,464,081 | 8/1984 | Hillier et al. | 405/128 |
| 4,483,641 | 11/1984 | Stoll | 405/129 |
| 4,526,615 | 7/1985 | Johnson | 405/129 X |

FOREIGN PATENT DOCUMENTS 4,526,615 7/1985 Johnson ............... 405/129 X

*Primary Examiner*—Dennis L. Taylor
*Attorney, Agent, or Firm*—Kenyon & Kenyon

[57] ABSTRACT

To control the spread of water from a waste depository body, a drainage layer and a sealing body are provided below the depository body. A control room underlies a major portion of the depository body and a major portion of the sealing body for facilitating visual inspection and repair of the sealing body and the drainage layer. The sealing body includes one or more plastic sheets inclined at an angle with respect to the horizontal to define water collection fields or areas. The sealing body may comprise a platform forming the ceiling of the control room, the ceiling platform being provided with pipelines for drawing off depository gases and with passages or openings for draining off seepage water.

27 Claims, 9 Drawing Figures

ARRANGEMENT FOR COLLECTING SEEPAGE WATER FROM DEPOSITORIES

BACKGROUND OF THE INVENTION

The invention relates to an arrangement for catching or collecting seepage water from depositories.

In the deposition of wastes, seepage water is produced. Depending on the composition of the waste matter, depositories may be charged with pollutants for decades or centuries. According to the present state of the art, depository seepage water is caught by seals, is collected and transported to a treatment facility.

Known types of seals are mineral seals (for example, clay, bentonite with water glass), bitumen seals or foil seals. Although such seals are basically suitable for their purposes, their reliability is limited. This is confirmed from practice and by the results of research projects (conducted by or under the West German Federal Environment Office, 1984). The localization and repair of leaks are problems for which no suitable solution has been provided to date. As a result, depositories are in principle no longer permitted in some water protection zones in certain countries. This limitation makes it impossible in large parts of those countries to find sites for residential garbage depositories. Sites for special waste depositories are generally difficult to get approved.

Advantageously, seepage water is collected separately from different lots. The reason for the separate collection is the different pollutant loading of different depository sections. By separate seepage water collection, contaminated depository sections can be localized and the seepage waters thereof can be channeled to suitable treatment facilities. If separate treatment is not carried out, mixed waters are drained off due to a dilution effect, for which mixed waters a separate treatment (such as a third purification stage) can hardly be considered. In this way, harmful substances are released into the environment unnecessarily. Reasons for the prevalent mixed water drainage include the insufficient reliability of drain lines due to a lack of strength and the plethora of hardware. Available data is inadequate to supply proof of fracture strength of commercial drain pipes for pressures which commonly prevail in a depository.

While other sealing systems such as that of ROLLINS, U.S.A., provide, in addition to several artificial seals, a fixed concrete bed, which provision increases the general reliability, the same reservations apply as in the other types of seals with respect to approval procedures because of the still existing residual uncertainty.

It is an object of the invention to provide an improved arrangement for collecting percolating water in waste depositories wherein the reliability of the sealing body can be checked visually at any time and the seal can be repaired simply and quickly in the event of damage.

SUMMARY OF THE INVENTION

In an arrangement according to the invention, a control room is located in the region below a sealing body so that the sealing action thereof can be inspected visually and repaired at any time from the control room. As soon as the seal becomes leaky at a point, the leak can be recognized immediately from the control room so that countermeasures can be initiated instantly. With an arrangement according to the invention, zero emission in the ground water body is possible. This facilitates substantially the location of sites for depositories since contamination of the ground water by seepage water is precluded with certainity. Depositories can be installed, if necessary, in water protection areas, using an arrangement according to the invention. Necessary repair work can be carried out simply and without difficulty from the control room. Because of the visual monitoring of the action of the sealing body, long-term security is assured in a very simple manner. By virtue of the ability to continuously monitor and control, it is possible to prevent the emission of seepage water regardless of its nature and concomitantly to include water protection zones in future site planning, which inclusion had been out of the question for this purpose heretofore.

By separate collection and sampling of the seepage water directly at the place of origin, a differentiated treatment can be initiated after the corresponding analysis results are available, the differentiated treatment including exemplarily biological or chemical purification, a third purification stage, seepage water evaporation or seepage water combustion. By this differentiated treatment, environmental pollution due to the dilution effects of mixed water drainage can be prevented and costs can be saved. The advantages of an arrangement according to the invention can be appreciated through a comparison, for example, with the West German depository Hamburg Georgsweder, in which dioxin-containing liquid wastes are mixed with other waste waters.

The knowledge of the localized pollutant concentrations makes it possible to perform targeted intervention from the outside, for example, by dredging the pollutant source.

The sealing body can consist of or comprise, a platform. Due to the high load (40 $t/m^2$ and more), the occurrence of differences between the individual platform sections and the formation of cracks due to shrinkage processes can be foreseen. In one preferred embodiment, the main sealing function is assumed by a pendent seal which is disposed below the entire underside of the platform. Advantageously the pendent seal has low points toward which the seepage water flows, this water being fed via secondary collectors to a main seepage water collector.

In order to achieve separate collection and sampling of the seepage water at the point of origin, the top side of the sealing body is preferably subdivided into fields by raised field boundaries arranged on the top side of the platform. The raised field boundaries form sealed partitions by which individual lots are delineated from each other. At the low points of the seal, control stubs for sampling seepage water are advantageously arranged.

A preferred application of the invention is for cleaning up existing contaminated sites. To this end, tunnels are advantageously driven close to each other below the contaminated site to thereby form a sealing platform. In the case that so-called migration of seepage water or gas from the space between the platform and the depository is expected, the depository is advantageously surrounded entirely or partially by a sealing wall comprising a vibrated narrow wall, a slit wall, sheet piling or the like, the sealing wall advantageously forming a unit with the platform. For the visual inspection and control of this horizontal seal, a double-shell design in the form of a double ring with an interposed cavity is used which design facilitates the collection of ground water which may possibly exert pressure on the outer sealing ring and penetrate into the arrangement. The recommended forms of the tunnels depend on the particular situation and the applied load and include the most varied proven designs such as:

the Hamburg design (see *Betonkalender* II, 1971, page 263), the poured-in-situ concrete/half-shell combination (see *Betonkalender* II, 1971, page 244), Simplon Tunnel I, with vertical applied load, Apennine Tunnel in the pressure-exerting rock, Autobahn Tunnel Genoa/Servavalle, Ville Tunnel, Cologne marginal canal, and other proven tunnel designs among which are also counted refrigeration techniques which are of interest in driving tunnels in the presence of ground water.

A control room under a platform supporting a waste depository is, in accordance with the invention, high enough to be accessed on foot or by vehicle for inspection or repair work. For drawing off high-colorific depository gas which can be produced, depending on the nature of the waste and conditions of the miliue, in orders of magnitude up to 30 m$^3$/t.a, suitable gas collection lines are brought advantageously through the platform from the control room. This arrangement obviates the problematic installation of gas collection lines on the surface of the depository. The control room itself is kept free of dangerous gas concentrations by forced ventilation.

DETAILED DESCRIPTION

Figure 1:
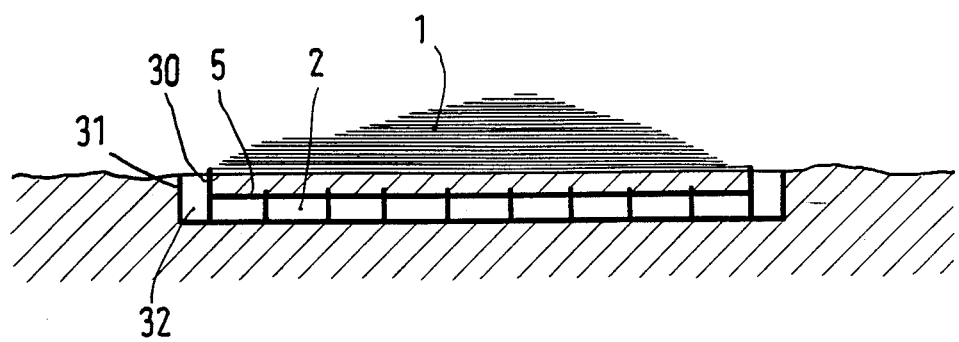
FIG. 1 is a schematic section through a waste depository with an underlying control room surrounded by a double sealing ring and with a horizontal field limitation, in accordance with the present invention.

FIG. 1 represents a cross section through a depository 1 underpinned over its entire base area by a control room 2. The depository was pre-existing and the control room was driven forward under the depository by tunnel construction techniques. A sealing platform 5 formed by the tunnels closely adjoins a sealing wall surrounding the depository substantially in a horizontal plane. The sealing wall is advantageously provided in duplicate, i.e., includes an inner sealing ring or wall 30 and an outer sealing ring or wall 31 separated from each other by an interposed cavity 32. The cavity forms a sealing space which is accessible on foot and/or by vehicle and can thereby be inspected visually and, if necessary, resealed.

Figure 2:
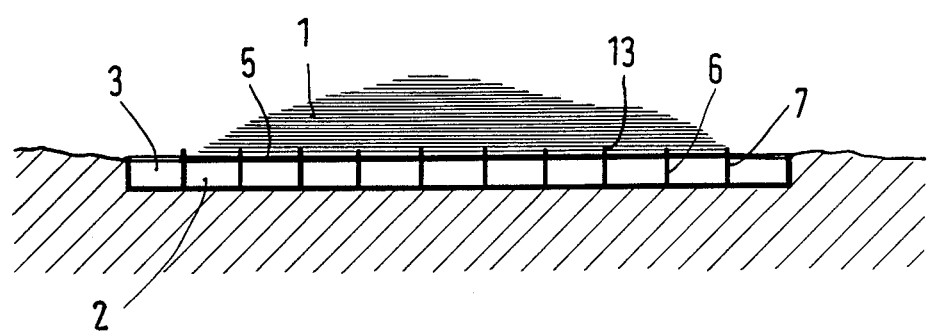
FIG. 2 is a schematic section through a newly installed depository with an underlying control room and a horizontal field limitation.
Figure 3:
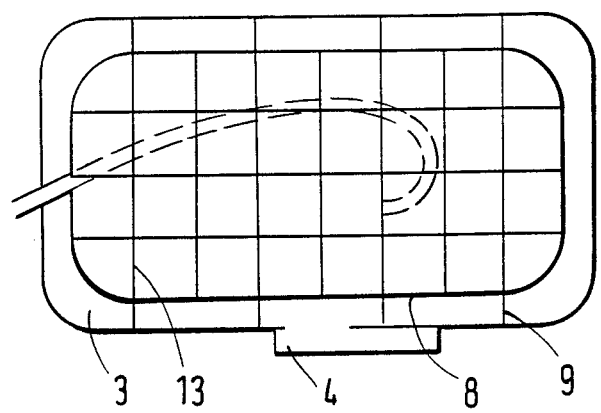
FIG. 3 is a top view of a control room in accordance with the present invention, showing a cassette subdivision and an exploratory lane.

FIG. 2 represents a section through a depository 1 which is sealed from the start by the arrangement in accordance with the invention. The depository of FIG. 2 is likewise underpinned over its entire base area by control room 2 which room is likewise sufficiently high so that servicing and inspection visits or runs can be made in it. For reasons of access, control room 2 is surrounded by an exploratory lane 3 communicating with an access path 4 (FIG. 3). The platform 5 is supported by supports 6 or walls 7. So that the control room 2 can be ventilated reliably and to thereby prevent the formation of explosive depository gas mixtures, walls 7 are advantageously traversed by lanes which can be closed off at their ends 8 of in the vicinity of access path 4 by bulkheads 9.

In one embodiment of the present invention (not shown), the floor of the control room is arranged flush with the ground. This makes possible free ventilation of the control room.

Measurements of seepage water have shown that local differences in the composition of the water can be expected. So that problematic, for example, toxic, seepage waters can be collected in a targeted manner and the corresponding depository sections or fields can be found, top side 5 of the platform is provided with vertical extensions 13 serving as raised field boundaries 13 projecting into depository 1 to form a multiplicity of cassettes. By the separate collection of seepage water from the resulting collecting fields, differentiated seepage water sampling and treatment can be performed.

Figure 4:
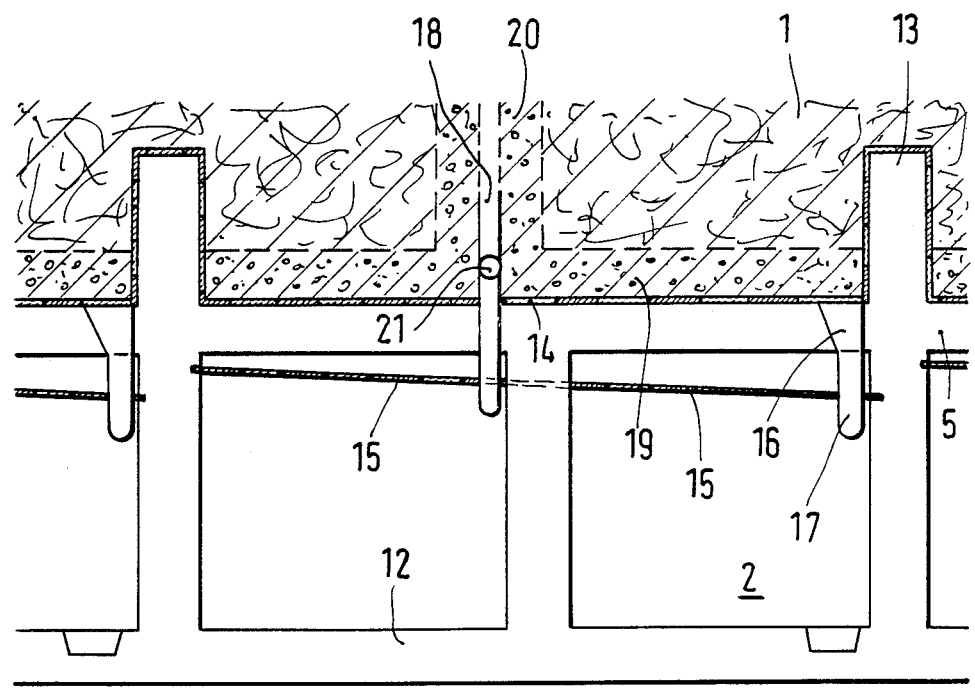
FIG. 4 is an enlarged cross section of part of control room of FIG. 3, showing a seal provided above the control room, a pendent seal, a floor run-off, a horizontal field limitation, a drainage layer, a drainage dome, and waste water and waste gas lines.

FIG. 4 shows in detail the platform 5 with an overlying seal 14 and a pendent seal 15, a seepage water feed-through or passage 16 and secondary collectors 17. For the purpose of degassing the depository, gas collection lines 18 traverse seals 14 and 15, as well as platform 5. Gas collection lines 18 open into a seepage water and gas area drainage or collecting system 19, as well as into vertical seepage water and gas domes 20 in which they are branched off, as indicated at 21 in FIG. 4. The bottom or floor 12 of control room 2 is inclined and can be drained via runoff grooves. In addition, sheet-like seals 15 are inclined downwardly towards secondary collectors 17.

Figure 5:
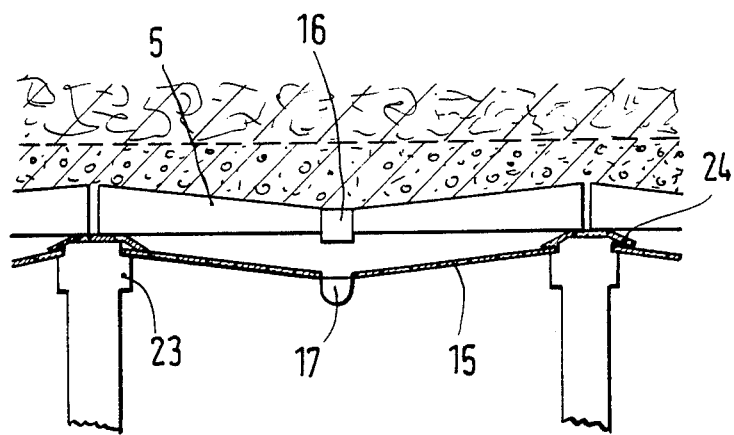
FIG. 5 is a view similar to FIG. 4, showing a further embodiment of a control room, in accordance with the invention, including cassette-shaped platform elements of a platform seal, a pendent seal, a drainage layer and waste water and waste gas lines.

FIG. 5 shows another embodiment of the present invention in which platform 5 is designed in the form of several completely prefabricated modules with respective central low points 16. Suspended seal 15 is formed by prefabricated shapes and is supported on brackets 23. The support heads of the brackets are provided with sealing caps 24 which adjoin the suspended seals 15. Seals 15 are each designed to have a centrally located secondary collector 17, into which seepage water is conducted.

Figure 6:
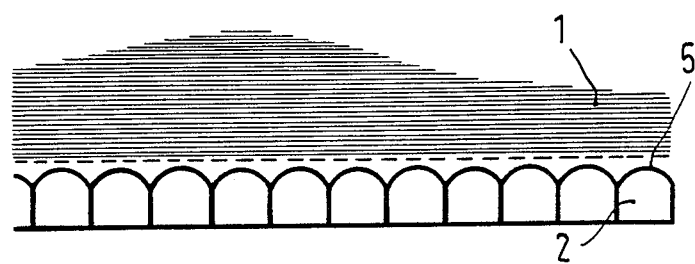
FIG. 6 is a view corresponding to FIG. 1, showing a platform, formed by half-shells, and a control room located underneath a waste depository.

As shown in FIG. 6, platform 5 may be formed from axially or bi-axially symmetrical half-shells. The platform again forms the ceiling of control room 2, which is arranged underneath depository 1.

Figure 7:
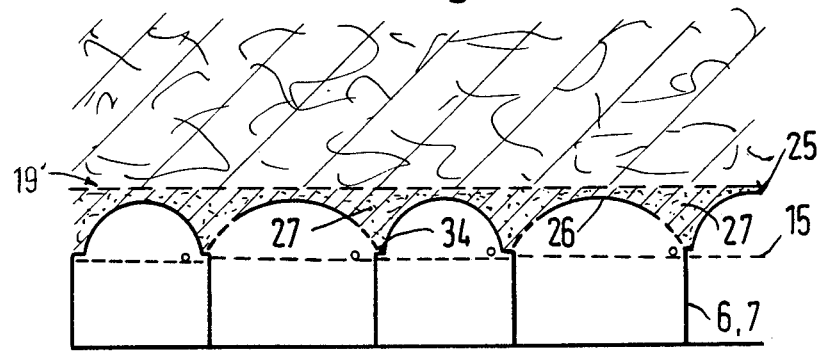
FIG. 7 is a partial cross-sectional view of a control room constructed of tunnel profiles, pursuant to the invention, wherein the tunnel profiles are connected to each other by half-shells.

In an embodiment of the invention shown in FIG. 7, platform 5 comprises a series of interconnected half-shells 26 defining respective individual tunnels 25 between respective adjacent tunnels. Removal of water from a drainage layer 19' is accomplished via passages 27 or interstitial spaces in the material of the drainage layer preferably into the control room section underneath half shells 26. In this case the suspended seal 15 is used to advantage. A connecting gap 34 between the support 6 or the wall 7 and the half-shell 26 is designed as a water passage.

Figure 8:
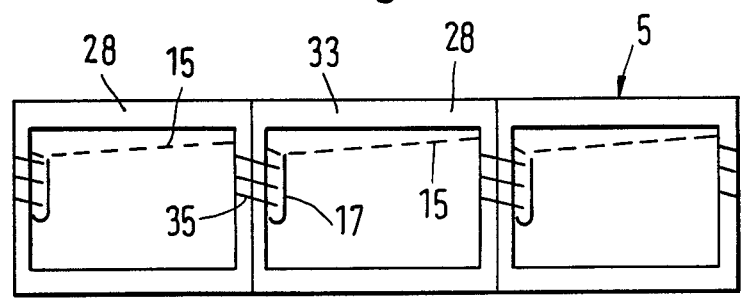
FIG. 8 is a schematic partial cross-sectional view of a control room formed by assembling tunnel profiles one against the other, pursuant to the invention.

In the embodiment of FIG. 8, several tunnel modules 28 are joined directly together to form the control room. The closely adjoining tunnels 28 also form a common platform 5. At a side wall of each tunnel 28 is arranged a secondary collector 17, towards which the respective suspended seal 15 is inclined so that collected seepage water is conducted into the secondary collector 17. In order to prevent seepage of percolating water in the vicinity of the adjoining vertical side walls of adjacent tunnels 28, at least one seal 35 is provided which extends crosswise through at least one of these side walls and which is inclined towards the adjacent secondary collector 17. Three such seals 35 are advantageously arranged on top of each other as shown in FIG. 8. If percolating water should seep into the vertical side walls of tunnels 28 or into a butt joint between adjacent side tunnels to the bottom, that water is intercepted by the transverse seals 35 and conducted to the respective secondary collector 17.

Figure 9:
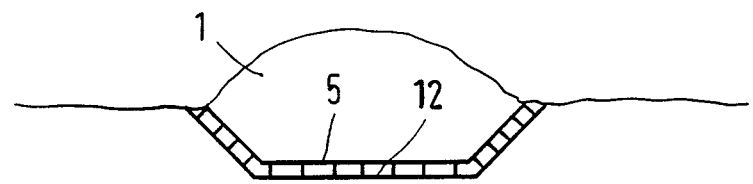
FIG. 9 is a schematic view, partially in cross section, of a pit depository.

FIG. 9 shows an arrangement of a sealing system in a pit depository. A platform 5 and the bottom 12 of a control room are matched to the shape of the terrain.

A control room in accordance with the invention 2 can consist of several rooms arranged on top of each other which arrangement serves for controlling and also storing wastes.

What is claimed is:

1. An arrangement for collecting seepage water from a waste depository body, comprising:
   sealing means including a planar sealing body underlying the depository body for controlling the spread of seepage water from a region about said depository body;
   drainage means in contact with said depository body for drawing off seepage water therefrom; and
   means for facilitating direct visual inspection and repair of said sealing body, said means for facilitating including a control room large enough to contain an adult human being in a walking posture, said control room underlying a major portion of said sealing body and a major portion of said depository body.

2. An arrangement according to claim 1 wherein said control room is formed after said depository body has been formed.

3. An arrangement according to claim 1, further comprising additional sealing means surrounding said control room substantially in a horizontal plane for forming an accessible, visually monitorable sealing space around said control room.

4. An arrangement according to claim 3 wherein said additional sealing means includes a pair of substantially vertical walls spaced from one another and consisting essentially of poured concrete.

5. An arrangement according to claim 3 wherein said additional sealing means includes a pair of substantially vertical walls spaced from one another and comprising a multiplicity of prefabricated parts.

6. An arrangement according to claim 1 wherein said control room includes a plurality of walls consisting essentially of poured concrete.

7. An arrangement according to claim 1 wherein said control room comprises a multiplicity of prefabricated parts.

8. An arrangement according to claim 1 wherein said sealing body includes means for subdividing said depository into a multiplicity of different fields for a separate collection of seepage water.

9. An arrangement according to claim 8 wherein said means for subdividing extends from an upper side of said sealing body into said depository body.

10. An arrangement according to claim 8 wherein said means for subdividing includes vertically oriented extensions of said sealing body.

11. An arrangement according to claim 1 wherein said sealing body is provided with an upper side inclined towards a baseline edge of said depository body.

12. An arrangement according to claim 1, further comprising means including pipelines extending through said sealing body into said depository body for drawing off gases generated therein, said control room having a ceiling, said drainage means including passages in said ceiling and said sealing body.

13. An arrangement according to claim 1 wherein said sealing body is a platform forming at least a portion of said ceiling of said control room.

14. An arrangement according to claim 13 wherein said sealing means further includes at least one substantially horizontal sheet-like sealing member juxtaposed to said sealing body.

15. An arrangement according to claim 14 wherein said sheet-like sealing member is suspended below said platform.

16. An arrangement according to claim 15 wherein said sealing means includes a plurality of substantially horizontal sheet-like sealing members suspended below said platform, said sheet-like sealing members being made of a dense material and having standardized dimensions.

17. An arrangement according to claim 13 wherein said platform has an underside coated by an adhesive sealing material.

18. An arrangement according to claim 1 wherein said sealing body has an underside coated by an adhesive sealing material.

19. An arrangement according to claim 1 wherein said drainage means includes a draining layer disposed between said sealing body and said depository body for facilitating the collection of seepage water and gases.

20. An arrangement according to claim 19 wherein said drainage means includes drainage pipes disposed in said draining layer.

21. An arrangement according to claim 1, further comprising means for preventing the formation of horizontal seepage water strata and horizontal gas strata in said depository body.

22. An arrangement according to claim 21 wherein said means for preventing includes substantially vertically extending drainage domes in said depository body.

23. An arrangement according to claim 22 wherein said drainage means includes drainage pipes disposed in said drainage domes.

24. An arrangement according to claim 1 wherein said control room is made in part of poured concrete and includes prefabricated elements, said prefabricated elements including a component selected from the group consisting of half shells, ceiling plates and supports.

25. An arrangement according to claim 1 wherein said control room is formed from tunnel modules connected to each other via prefabricated elements.

26. An arrangement according to claim 1 wherein said control room is formed from tunnel modules connected directly to each other.

27. An arrangement according to claim 8 wherein said sealing means includes a plurality of planar sealing bodies each disposed at an angle with respect to a horizontal plane, said sealing bodies defining respective fields for collection of seepage water.

* * * * *

UNITED STATES PATENT AND TRADEMARK OFFICE
CERTIFICATE OF CORRECTION

PATENT NO. : 4,728,222

DATED : March 1, 1988

INVENTOR(S) : Klaus Wiemer

It is certified that error appears in the above-identified patent and that said Letters Patent is hereby corrected as shown below:

On the cover page, under "FOREIGN PATENT DOCUMENTS" change "4,526,615 7/1985 Johnson .......... 405/129X" to -- 958,745 5/1964 Great Britain .......... 405/55 --.

Column 3, line 18, change "high-colorific" to -- high-calorific --.

Column 3, line 20, change "miliue" to -- milieu --.

Column 4, line 66, after "depository" add -- body --.

Column 5, lines 1 and 2, after "25" delete "between respective adjacent tunnels".

Column 6, line 14, change "8" to -- 9 --.

Signed and Sealed this

Eighth Day of November, 1988

Attest:

DONALD J. QUIGG

*Attesting Officer*  *Commissioner of Patents and Trademarks*